July 12, 1927.
E. B. PAXTON
1,635,764
ARC WELDING
Filed Feb. 5 1927
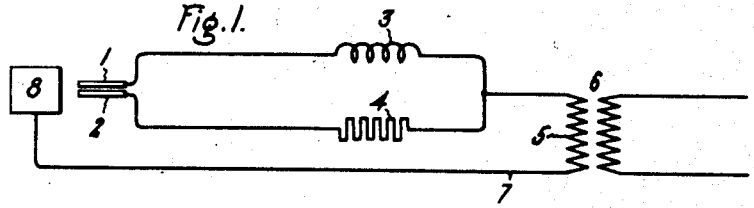
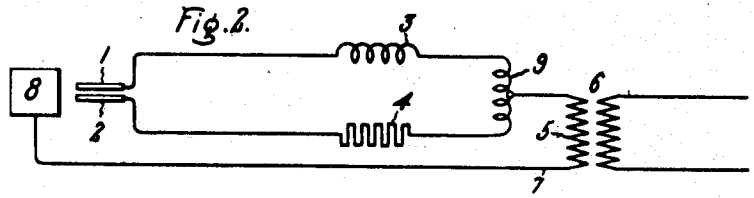
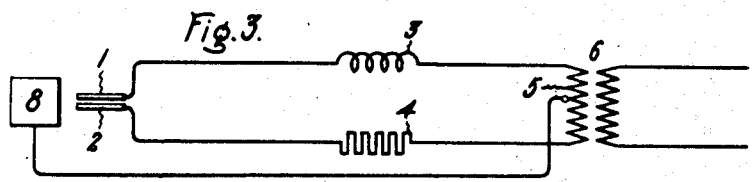
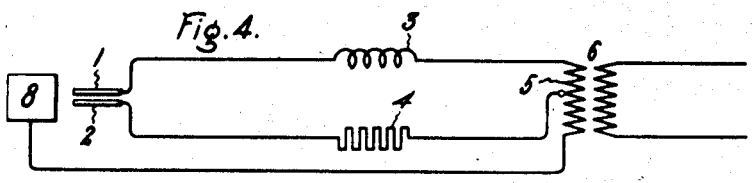
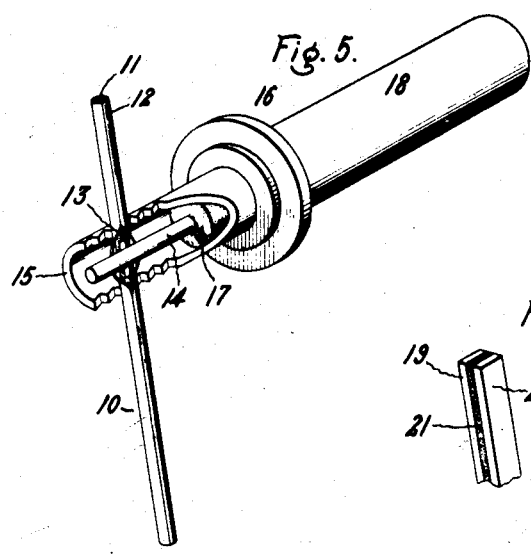
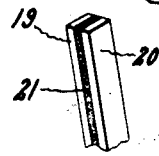
Inventor:
Earl B. Paxton,
by *Alexander S. Lune*
His Attorney Patented July 12, 1927.

1,635,764

UNITED STATES PATENT OFFICE.

EARL B. PAXTON, OF SCHENECTADY, NEW YORK, ASSIGNOR TO GENERAL ELECTRIC COMPANY, A CORPORATION OF NEW YORK.

ARC WELDING.

Application filed February 5, 1927. Serial No. 166,214.

My invention relates to metal working by means of the electric arc and particularly to arc welding, cutting or repairing with single phase alternating current.

It is more difficult to operate with an alternating current arc than with a direct current arc because of the instability of the alternating current arc. This instability of the alternating current arc is due largely to the cooling of the gaseous arc path during the time when the current passes through zero value when the arc is more likely to break than with direct current.

I propose to obtain alternating current arc stability in single phase systems of arc welding and cutting by producing by a suitable arrangement of the welding circuit a plurality of arcs with relative phase displacement operating in parallel and acting upon the same portion of the work. By such an arrangement the conductivity of the arc path for either arc while the current passes through zero will be maintained by another arc in which the current does not pass through zero at the same time.

According to my invention, instead of using an electrode made of a single conductor, I use an electrode formed of a plurality of conductors insulated one from another throughout their length. To these conductors I apply currents that are suitably dephased, relative to each other, as will be subsequently described, so that, when the arc between the work and the electrode is zero, there will exist a current between the electrodes of the conductor that will maintain the arc. Thus, although the resultant current to the work will be a single phase alternating current with zero instantaneous values, at the instant of reversal there will be a current flowing between the tips of the electrode of the different phases which will tend to maintain the arc path to the work in a state of conductivity.

My invention will be better understood from the following description when considered in connection with the accompanying drawing, and its scope will be pointed out in the appended claims.

Referring to the drawing, Figs. 1, 2, 3, and 4 show diagrammatically several circuits adapted to effect the purpose of the present invention; Fig. 5 shows a suitable electrode and holder for use in practising my invention; and Fig. 6 shows another form of welding electrode that may be used.

The proposed arrangement in its simplest form consists of resistance and inductive reactance connected to the two conductors of an electrode and to the supply circuit as diagrammatically illustrated in Fig. 1. In this figure, 1 and 2 represent the component parts of an electrode formed of two conductors that are insulated from one another throughout their length. These conductors are connected through a reactance 3 and a resistance 4 to one terminal of a secondary 5 of a transformer 6. In this figure, the other terminal of the secondary 5 is connected by a conductor 7 to the work 8. The transformer 6 is supplied with energy from a suitable source of alternating current, not shown. It is, of course, apparent that the transformer 6 may be eliminated and the connection made directly to any suitable source. Either or both the resistance 3 or inductance 4 may be made adjustable in order to vary their effect on the welding current and control the phase displacement existing between the currents supplied to the conductors of the electrode.

It may be desirable under certain conditions to use in the welding circuit a balance coil. Such an arrangement is shown in Fig. 2. In this figure, one terminal of the secondary 5 of transformer 6 is connected to a mid-point of a balance coil 9. The other terminals of this coil are connected through an inductance 3 and a resistance 4 to the conductors 1 and 2 of the welding electrode. This balance coil serves to facilitate the striking of the arc and to secure approximately equal currents in the branch circuits including reactance 3 and resistance 4.

Two other arrangements for securing the desired effect are shown in Figs. 3 and 4. In Fig. 3 the conductors 1 and 2 of the electrode are connected to the secondary terminals of transformer 6 through an inductance 3 and a resistance 4 and the work 8 is connected to a mid-point of the transformer winding. In Fig. 4, the conductors 1 and 2 are connected through inductance 3 and resistance 4 to the terminal and an intermediate point of the secondary winding 5 of the transformer 6 while the work 8 is connected to the other terminal of the secondary 5.

Referring to Fig. 5, I have shown a suitable electrode and electrode holder for use in practising my invention. The electrode 10 comprises a core or inner portion 11 and a sheath or outer portion 12 which is insulated by a suitable medium 13, which, if desired, may also be a flux, from the core member 11. The sheath is illustrated as opened at some point along its length and the insulation removed from the inner member so that a conductive contact may be made with the core and sheath members of the electrode by members 14 and 15 of an electrode holder 16. These members are insulated from one another by a bushing 17 which together with these members is mounted in holder 18 which provides a suitable handle. The members 14 and 15 are provided with terminals for connecting the conductors of the electrode to the welding circuit according to some arrangement as above described. Member 15 comprises a pipe or tube having its end portion cut diagonally and provided with notches along its diagonal section, while member 14 is a rod located centrally within member 15. The electrode is held by a wedging action in one of the grooves of member 15 by member 14. It is apparent that my invention is not limited to any particular construction of electrode holder.

Another form of electrode is shown in Fig. 6. This electrode is formed of two rectangular strips of suitable weld material 19 and 20 separated by a suitable insulating material 21 which may at the same time serve as a binder to hold strips 19 and 20 together. This material may be a flux as has been noted with respect to the electrode described in Fig. 5.

While I have described certain arrangements for practising my invention, it is to be understood that in its broadest aspect the method of connection is immaterial as long as a difference in phase between the currents supplied to the conductors of the electrode is brought about. One way of practising the invention is by applying high frequency to an electrode such as shown in Fig. 5 when, due to the skin effect, the desired difference in phase between the arcs maintained by the electrode will be automatically brought about.

It is to be noted that with my arrangement the work functions as one electrode with respect to each of the currents flowing in the conductors of the welding electrode. The currents supplied to the welding electrode may be out of phase with respect to each other to a greater or less extent. The more out of phase they are the greater is the percentage of total heat which is generated at the electrode tip and the less is the percentage of total heat that is generated in the work. With my arrangement, however, the apportionment of heat may be regulated by suitably adjusting the constants of the circuits to secure a greater or less phase displacement between the currents supplied to the conductors forming the welding electrode. If the phase displacement is great, considerable heat will be generated at the tip of the welding electrode. Such an arrangement would be useful when welding thin plates. If, however, greater heat is to be generated in the work, the relative phase displacement would be lessened. The invention may be applied to carbon arc welding as well as metallic arc welding and a non-consuming electrode, such as tungsten, may be used.

While I have shown and described the use of reactance and resistance to adjust the electrical constants of the circuits feeding the welding electrode and thus secure the desired split-phase relationship, it is to be understood that capacitance may be used in place of inductance or resistance to accomplish the desired effect of giving to the circuits different electrical constants.

What I claim as new and desire to secure by Letters Patent of the United States, is:

1. The method of welding with single phase alternating current which comprises splitting the phase and maintaining an arc with the dephased currents thus produced.

2. The method of electric welding wherein an arc is maintained between an electrode and the work by a single phase alternating current source which comprises dividing the welding current into a plurality of dephased component parts and maintaining with said component parts a plurality of arcs with relative phase displacement operating in parallel upon the same portion of the work.

3. The method of welding with single phase alternating current which comprises dividing the welding current into a plurality of dephased components, applying said dephased components to the individual conductors of a welding electrode comprising a plurality of conductors insulated from one another throughout their length and maintaining an arc between said electrode and the work which is connected to the alternating current source.

4. Apparatus for electric arc welding comprising a source of single phase alternating current, means for connecting one terminal of said source to the work, a welding electrode formed of a plurality of conductors insulated from one another throughout their length, and means comprising a plurality of parallel circuits having different electrical constants for connecting the other terminal of said source to the individual conductors of said electrode.

5. Apparatus for electric arc welding comprising a source of single phase alternating current, means for connecting said source to supply an arc with the work as one arcing terminal and means terminating at a plurality of other arcing terminals for splitting the phase of the welding current between the source and such other arcing terminals.

In witness whereof, I have hereto set my hand this 4th day of February, 1927.

EARL B. PAXTON.